Sept. 25, 1962  S. P. BECKER  3,055,623
AERIAL CABLE SUPPORT
Filed March 14, 1960  4 Sheets-Sheet 1
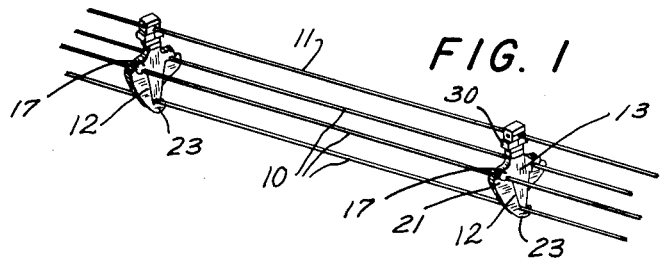
FIG. 1
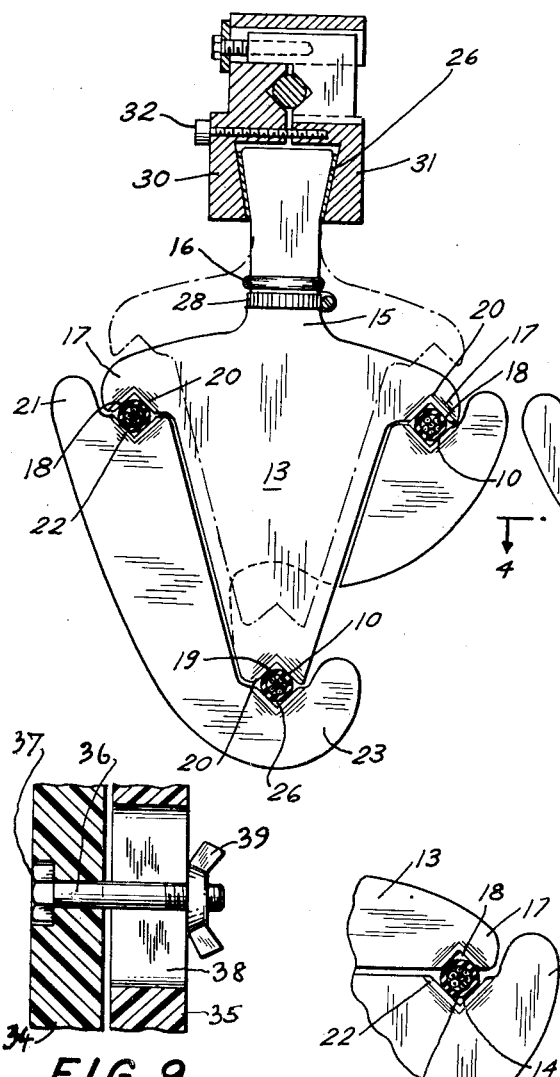
FIG. 2
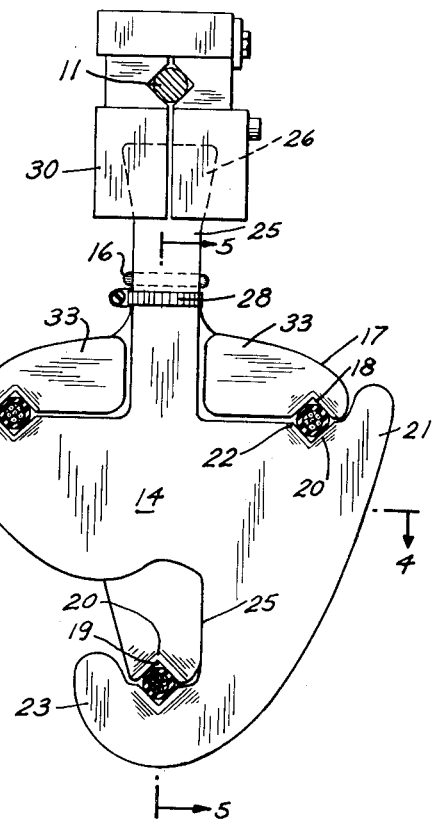
FIG. 3
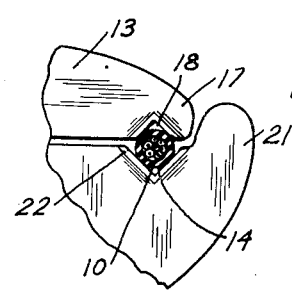
FIG. 6
FIG. 9
INVENTOR.
STEPHEN P. BECKER
BY
Kane, Dalsimer and Kane
ATTORNEYS

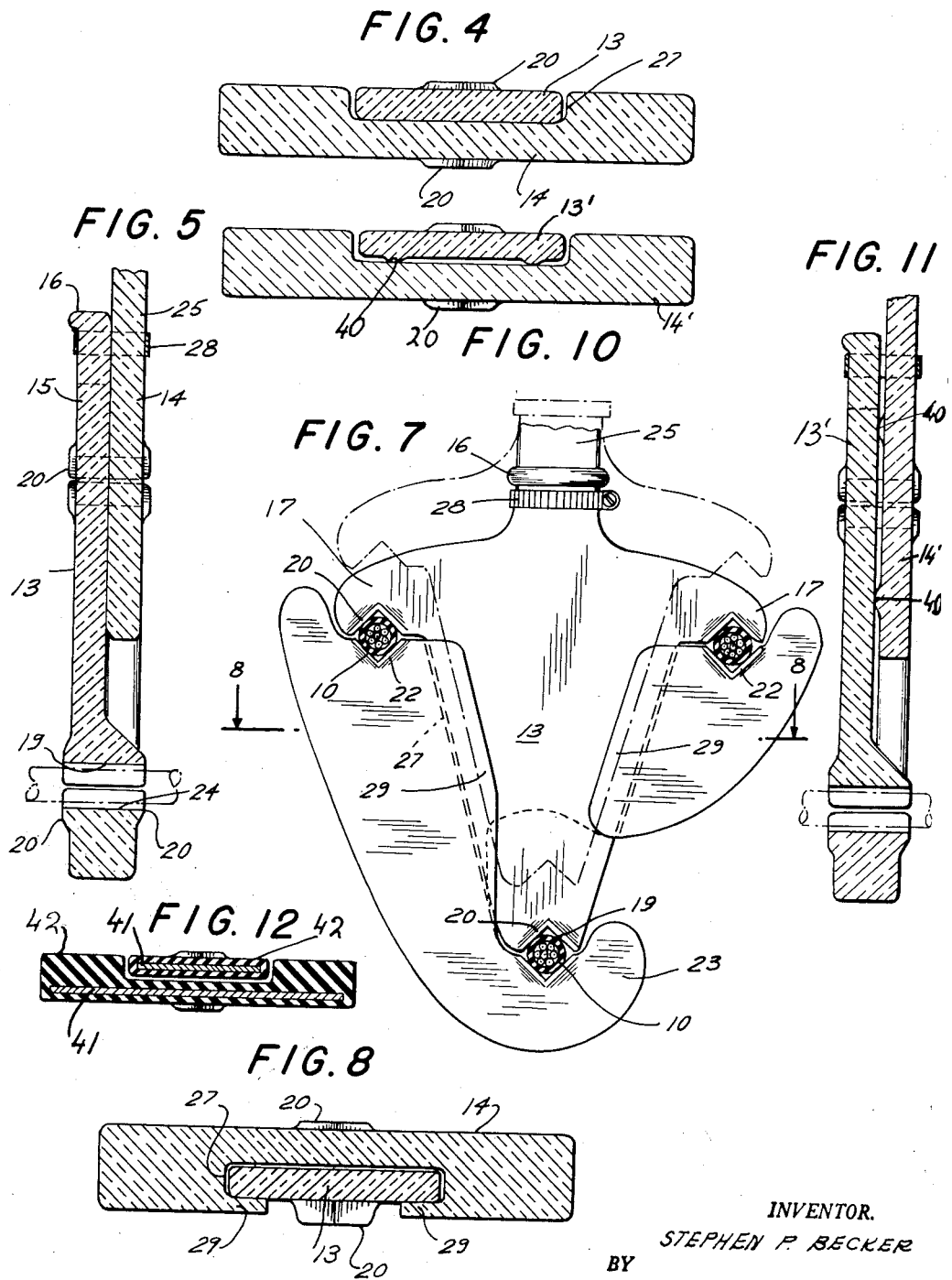

Sept. 25, 1962 S. P. BECKER 3,055,623
AERIAL CABLE SUPPORT
Filed March 14, 1960 4 Sheets-Sheet 3

INVENTOR.
STEPHEN P. BECKER
BY Kane, Dalsimer and Kane
ATTORNEYS

Sept. 25, 1962 S. P. BECKER 3,055,623
AERIAL CABLE SUPPORT
Filed March 14, 1960 4 Sheets-Sheet 4
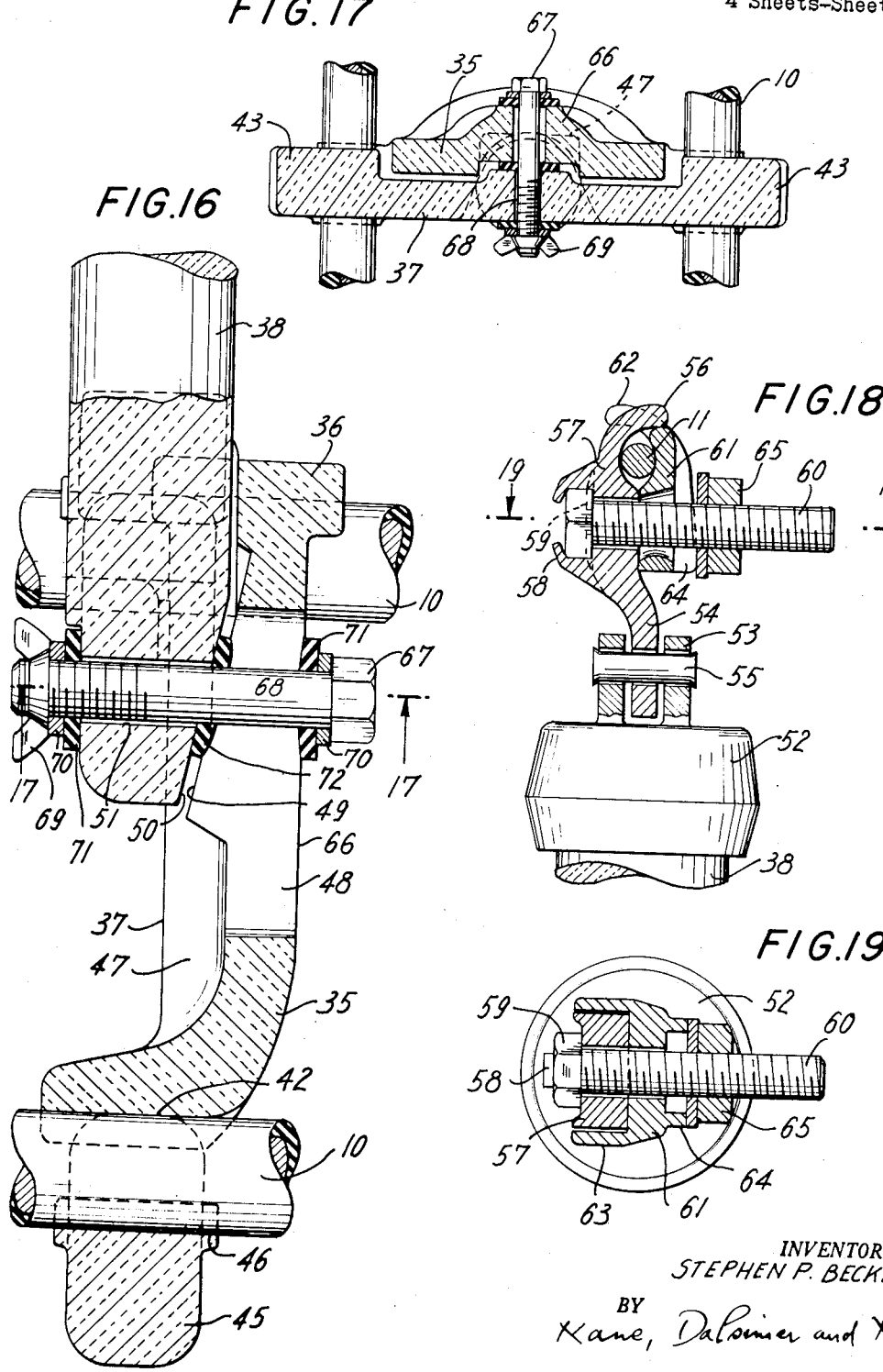
INVENTOR.
STEPHEN P. BECKER
BY Kane, Dalsimer and Kane
ATTORNEYS

United States Patent Office 3,055,623
Patented Sept. 25, 1962

3,055,623
AERIAL CABLE SUPPORT
Stephen P. Becker, Poughkeepsie, N.Y., assignor to Fargo Mfg. Company, Inc., Poughkeepsie, N.Y., a corporation of New York
Filed Mar. 14, 1960, Ser. No. 14,865
7 Claims. (Cl. 248—61)

This invention relates to a structurally and functionally improved aerial cable or mid-span conductor support and spacer, commonly known as a "spreader."

This application is a continuation-in-part of my prior application for United States Letters Patent entitled "Aerial Cable Support" and filed on March 27, 1959 under Serial No. 802,518 (now abandoned).

It is an object of the invention to furnish a unit of this character serving to maintain adjacent transmission cables in properly spaced relationship, and in which the support will not shift axially of the cables when once applied thereto, despite the fact that it will not be necessary to employ bushings in positions interposed between the spreader jaws and the cables.

A further object is that of furnishing a unit in which the parts will be substantially self-centering with respect to cables to be gripped thereby. In other words, despite variations in dimensions incident to quantity production techniques and other causes, the jaws of the spreader will grip each cable with substantially the same pressure exerted by the jaws in gripping an adjacent cable.

An additional object is that of designing a support of the type stated which will be of simple construction and capable of economical manufacture by using virtually any desired and proper material; the device being capable of ready application by a linesman to the cables to maintain them in properly spaced relationship and substantially free from electrical losses for indefinite periods of time.

Still another object is that of furnishing an improved spreader which may be used either in a mid-span location or adjacent a pole or similar cable-supporting structure. Regardless of its location, the unit will remain in proper position and maintain proper relative cable spacing even under high wind conditions or in other situations involving unusual stress.

With these and other objects in mind, reference is had to the attached sheets of drawings illustrating practical embodiments of the invention, and in which:

FIG. 1 is a perspective view showing a pair of supports applied to cables and with these supports conveniently suspended from a messenger wire or cable;

FIG. 2 is a partly sectional front view of the support;

FIG. 3 is a rear view thereof;

FIG. 4 is a transverse sectional view taken along the line 4—4 in the direction of the arrows as indicated in FIG. 3;

FIG. 5 is a fragmentary sectional side view taken along the line 5—5 in the direction of the arrows as indicated in FIG. 3;

FIG. 6 is a fragmentary face view of a slightly modified jaw structure which may be embodied in the support;

FIG. 7 is a view similar to FIG. 2, but showing a different form of construction;

FIG. 8 is a transverse section taken along the line 8—8 in the direction of the arrows as indicated in FIG. 7;

FIG. 9 is a fragmentary sectional view of an alternative form of securing the sections of the spreader assembly against movements with respect to each other;

FIG. 10 is a transverse sectional view similar to FIG. 4, but showing a section-spacing structure as part of the assembly;

FIG. 11 is a sectional side view similar to FIG. 5, but also illustrative of such spacing;

FIG. 12 is a transverse sectional view showing an alternative form of structure for the bodies of the sections providing the spreader;

FIG. 16 is an enlarged sectional side view taken along the line 16—16 in the direction of the arrows as indicated in FIG. 13;

FIG. 17 is a transverse sectional view taken along the line 17—17 in the direction of the arrows as indicated in FIG. 16;

FIG. 18 is an enlarged fragmentary sectional side view taken along the line 18—18 in the direction of the arrows as indicated in FIG. 13; and FIG. 19 is a transverse sectional view taken along the line 19—19 in the direction of the arrows as indicated in FIG. 18.

Figure 13:
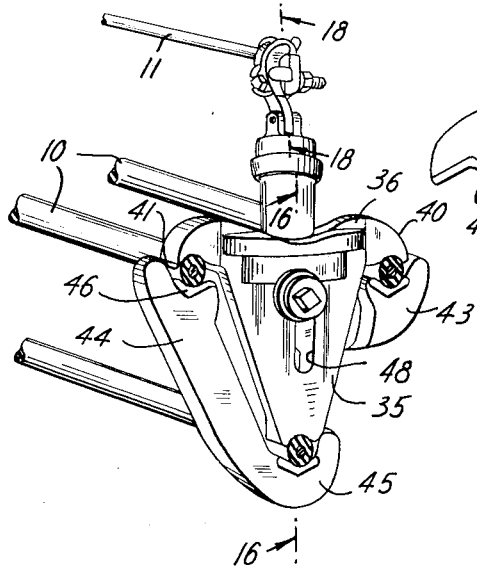
FIG. 13 shows an alternative and in some respects preferred form of support.

Referring primarily to FIG. 1, there has been illustrated one example of the manner in which the support is disposed with respect to a mounting for the purpose of maintaining transmission cables in properly spaced relationship throughout their entire span and for relieving excessive strain on those cables. Thus, the numeral 10 indicates the current-carrying cables, which are engaged by supports 12 in order to achieve the desired results. In this view, merely three cables have been shown, together with a messenger wire or cable 11. It is from the latter that the supports 12 are suspended. While in many respects the foregoing example is a preferred and commonly employed expedient, it is to be understood that it is merely illustrative. In other words, a lesser number of cables might be involved, or the structure of the support might be modified to accommodate a greater number of cables. Also, the messenger wire or cable might in certain instances be dispensed with.

Now, referring to the structure shown in FIGS. 2 to 5 inclusive, it will be observed that the support embraces two main body sections 13 and 14 of somewhat similar outlines, which in the present instance are generally wedge-shaped or triangular. Body 13 has extending from its upper edge a manipulating portion 15, preferably terminating in a head or knob 16. Projecting parts 17 are defined by this upper edge and terminate in jaws 18, preferably in the form of downwardly extending V-shaped notches. The lower end of body 13 is of reduced area and defines a similar jaw 19. Adjacent one or all of these notches the body section 13 may be thickened so that the jaws are defined by flanges 20, which reinforce the support at these points.

Section 14 of the support has adjacent the upper corners of its main body portion upstanding parts 21, which, if provided, preferably overlap to some extent the outer edges of the extended portions 17 of section 13. Within the upper edge of body 14, jaws 22 are formed. These preferably embrace upwardly facing V-shaped notches, and may also be defined upon the outer faces of section 14 by flanges 20. As illustrated, the distance between jaws 22 is equal to the spacing between jaws 18.

The lower end of section 14 is extended in the form of a hook-shaped portion 23 which with the parts assembled, overlaps the surfaces defining notch or jaw 19. Within the base of this hook an upwardly extending jaw is defined, which, as illustrated, may again be in the form of a V-shaped notch. The distance between this jaw and jaws 22 is equal to the spacing between jaws 18 and 19 in section 13. A manipulating and mounting portion 25 extends upwardly from section 14 at a point midway between jaws 22. The length of this mounting portion is greater than that of part 15 of section 13. It preferably terminates in a head 26 of enlarged or tapered outline. The face of section 14 is recessed, as indicated at 27 in FIG. 4, so as to accommodate section 13 when the latter is in face-to-face contact with section 14.

However, the parts are so proportioned that a certain amount of shifting of one section with respect to the other can occur as the several jaws of the section engage the cables 10 to be gripped. Therefore, a somewhat self-centering structure is furnished which will assure that the different jaws grip the different cables with substantially the same degree of pressure. When the cables are once so gripped, a securing device will maintain the parts of the support against movement with respect to each other. That securing device may take the form of a clamp 28 encircling portions 15 and 25 and of a construction similar to that of a hose clamp, so that it may be constricted therearound to secure the sections adjacent their upper ends against shifting with respect to each other.

Any tendency of the sections to shift away from each other adjacent their lower ends is, of course, prevented, in that these ends are in firm engagement with gripped cables, which thus function as supports to prevent that shifting. The sections may be formed of many different materials, including glass, porcelain or other ceramics. If it became desirable to reduce their weight, they could be skeletonized to eliminate areas unnecessary for strength. In all events, they should provide a substantially rigid asembly. Ceramic materials being in many respects preferable, it is apparent that high dielectric properties will be incorporated, such that electrical losses incident to the use of the supports will be virtually nonexistent.

Where it is desired to embody in the support a structure such that the sections will be braced adjacent their lower zones to prevent movements away from each other, a design as shown in FIGS. 7 and 8 may be employed. There the same numerals designate similar, heretofore described parts. It will be observed that the recess 27 does not have an open face as in FIG. 4. Rather, it defines an undercut chamber by virtue of flange portions 29. These are spaced from the base of recess 27 a sufficient distance to accommodate the section 13 therein. When that body grips with its jaw portions cables 10, flanges 29 will overlap its edge zones and thus restrain it from outward movement. Obviously, when section 13 is slightly retracted with respect to section 14, its reduced area will clear flanges 29, thereby permitting of complete detachment. Again, with proper clearances between the mating surfaces, it is apparent that a self-centering and even-gripping structure is furnished.

If it is desired that the centering provisions of the jaws be functionally emphasized and that cables of varying diameters may be intimately gripped thereby, the jaws may embrace different areas. This has been generally shown in FIG. 6, in which only one pair of jaws 18—22 has been illustrated. In that view the gripping surfaces providing jaw 18 are of lesser area than are those providing jaw 22. Therefore, an assembly is furnished in which a given cable will be properly gripped, and any compensation necessary to equally grip adjacent cables will be provided for by the tendency of the fulcrum point furnished by one gripped cable to rock the sections with respect to each other as the parts are tightened, having mind that a certain looseness of fit exists with respect to these parts.

The head portion 26 of the extension 25 is preferably received within a socket 30. A layer of cement 31 may be interposed between the adjacent faces of the head and socket bore. This socket depends from a suitable clamp, which may take one of numerous different forms. Conveniently, it will include a structure such as shown in the United States Patent of Wengen et al. 2,631,346, dated March 17, 1953, on a "Messenger Wire Clamp." The unit will come to the linesman with the clamp affixed to the support. The linesman will simply dispose one each of the cables 10 within the notches or jaws 22 and 24. Thereupon, he will apply section 13 to section 14 and move the two axially of each other to cause jaws 18 and 19 of section 13 to bear against the cables within the jaws of section 14 and thus grip these cables between the opposed cooperating jaw portions. This clamping action will be emphasized by the weight of section 13. When such a condition has once been established, then the locking device provided by the clamp 28 or its equivalent is actuated. This will assure against any accidental shifting of the parts. The clamp 32 is applied to the messenger wire or cable 11. Thereupon, the entire assembly is properly suspended, with the cables maintained in spaced relationship with respect to each other.

The elements or sections 13 and 14, while of similar outlines, should preferably have areas such that one is of less size than the other. Proper edge zones of the elements are formed with aligned and opposed notches providing gripping jaws. The center lines of all the notches extend substantially parallel to each other and to the axis of the spreader. The movements of the sections in both their application to the cables and their removal therefrom will be in opposite directions, and also parallel to the axis of the support. Guiding of the sections with respect to each other will follow as a consequence of the surfaces included in or between spaced portions 33 of section 13, the surfaces defining recess 27 in section 14 and other mating surfaces of the sections.

Figure 14:
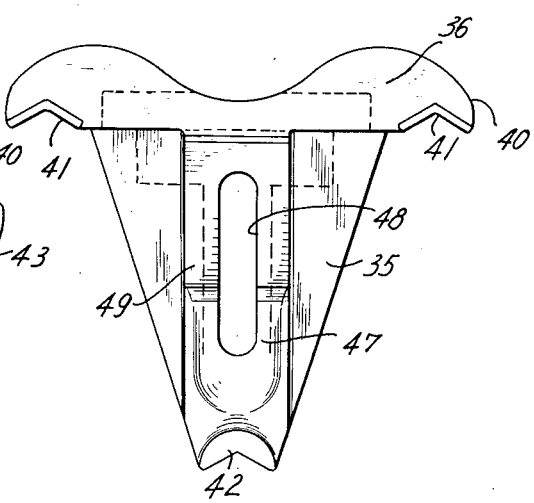
FIGS. 14 and 15 are face views of the elements of that assembly.
Figure 15:
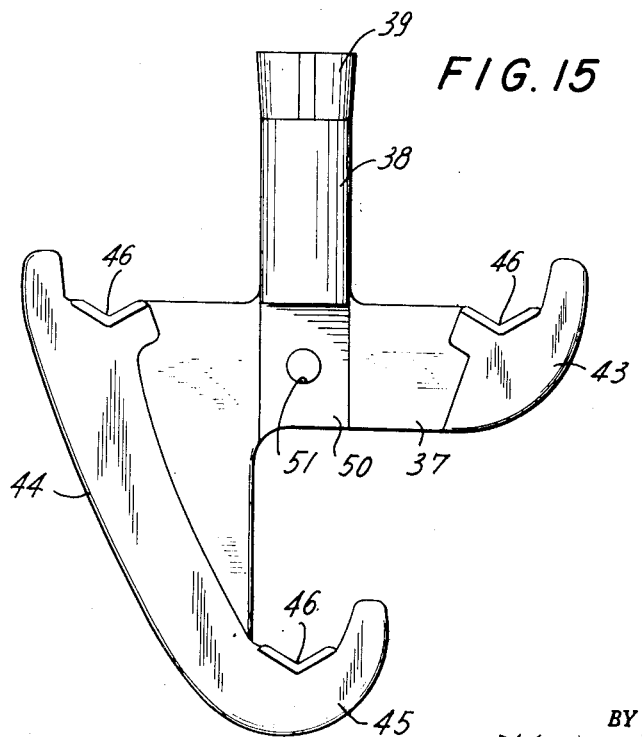

Referring now to the assembly illustrated in FIGS. 13 to 19 inclusive, it will be noted that the spreader is preferably suspended from a messenger cable 11 to maintain a number of current-carrying lines properly spaced from each other. As in FIG. 14, a pair of sections are involved. As in FIG. 14, one section 35 is conveniently of wedge shape and has its upper edge defined by a relatively thickened portion 36. Similarly, the central area 37 of the second section illustrated in FIG. 15 is of reduced thickness. A manipulating and supporting portion 38 extends upwardly therefrom and terminates in a preferably flared head 39 corresponding to head portion 26. This serves to mount a clamp assembly, the details of which will be hereinafter described. This section in common with section 14 of FIGS. 1 to 12, inclusive, has greater width than the section disposed adjacent it.

Returning to a consideration of FIG. 14, it will be seen that the relatively thickened portion 36 has projecting parts 40 extending beyond the base portion of the wedge-shaped body 35. In the edges of these extended portions, notches 41 are formed. A similar notch 42 is provided at the lower end of the wedge portion. As in FIG. 15, relatively thickened portions 43 and 44 serve to define edge zones of the second section. The portion 44 is continued downwardly and terminates in a preferably hook-shaped part 45. Notches 46 are formed in the upper edges of the thickened portions 43, 44 and 45 and with the sections operatively disposed with respect to each other parts 43, 44 and 45 at the ends of the second section will overlap the parts of section 35 presenting notches 41 and 42. The spacing of these notches corresponds to the spacing of the notches 41 and 42 formed in the first section shown in FIG. 14. The distance between the opposed thickened portions 43 and 44 is slightly greater than the length of the base edge defining the wedge section 35.

Extending axially of section 35 is an outwardly bulged portion, the inner face of which is defined by a recess 47. Extending throughout the major length of this recess is a slot 48. To each side of the slot, flattened surfaces 49 are provided on the inner face of this section. As is most clearly shown in FIG. 16, those surfaces extend at an incline to the longitudinal axis of the assembly. In the inner face and corresponding central area 37 of the second section a similarly inclined surface 50 is provided. This surface has an area such that it may bear against both the surfaces 49. It is interrupted by an opening 51 through which passes a bolt assembly hereinafter described. With the parts in proper positions the portion 38 will ride within recess 47 as shown in FIG. 17.

If a clamp forms a part of the cable support, then it is desirable that it be generally of the type illustrated in FIGS. 13, 18 and 19. In all events, it is preferred that the clamp be pivotally connected with the section assembly as shown in these figures. By such an expedient, the clamp may be applied to a messenger wire or cable where the latter extends at an angle to the horizontal, and the sections engaging the current-conducting cables will extend vertically to properly maintain those cables without exerting an undue strain on any of the parts.

The details of this clamp have been best shown in FIGS. 18 and 19, in which the reference numeral 52 indicates a preferably metallic cap secured to the head zone 39 of the supporting and manipulating portion 38. Such securing may conveniently be achieved by a suitable adhesive. Extending from the upper surface of this cap are a pair of ears 53, between which the shank 54 of a supporting member extends; it being coupled in position by a pivot pin 55. The outer end of the shank preferably terminates in spaced fingers 56, with the central portion 57 of the shank being offset. From the outer face of that portion, extensions 58 are defined and receive between them the head 59 of a bolt. The shank of the latter, as at 60, extends through an opening in the centrally offset part 57. A member 61 complementary to the shank member 54 is provided and furnished with an opening through which bolt 60 also extends. Member 61 also preferably terminates in finger portions 62 which extend into the spaces between fingers 56. In this manner an enclosing structure for the messenger wire 11 is provided.

To properly guide parts 57 and 61 with respect to each other, the latter is conveniently provided with extended side portions 63 slidably bearing against the side edges of the offset part 57. Extension 64 may also be formed in the outer face of part 61. Thrusting against this extension is a nut and washer assembly 65. It is apparent that the latter may be shifted along bolt 60 to a point where fingers 56 and 62 are entirely separated from each other, and therefore the messenger wire may be introduced into the space intervening them. Conversely, by tightening the nut, part 61 will be shifted toward part 57 to cause the messenger wire to be firmly gripped. A turning of the nut 65 of course does not result in a turning of the bolt, due to the fact that the head of the latter is firmly secured against rotation.

The recessed portion 47 of the relatively thin wedge section 35 is preferably defined on the outer face of that section by a bulged portion 66, as shown in FIGS. 16 and 17. A retaining assembly extends through opening 51 and slot 48 to secure the sections against separation and to permit of their adjustment with respect to each other, after which the assembly prevents further movement occurring on the part of one section with respect to the other. As best illustrated in FIGS. 16 and 17, the assembly will preferably include a bolt embracing a head 67 and a shank 68. The latter has a length such that with the head beyond the outer face of one section, the end of the shank will extend beyond the outer face of the second section. A wing nut 69 is preferably mounted at that point. Metal washers 70 are conveniently disposed adjacent the inner faces of head 67 and nut 69. Resilient washers are in turn interposed, as at 71, between the metal washers 70 and the outer faces of the two sections. A further resilient washer 72 is mounted by the shank 68 to intervene the angularly extending faces 49 and 50. By such a construction it is obvious that if the sections are formed of porcelain or similar material, adequate protection of the parts will obtain not alone adjacent faces 49 and 50, but also adjacent the outer faces of the sections. Additionally, those sections may adjust with respect to each other to assure a firm gripping of each of the cables to which they are applied. However, after assembly, a skidding or slipping of the parts is prevented, and between the angularly extending faces an adequate drainage area is assured.

In common with the design of the support shown in FIGS. 1 to 12 inclusive, the assembly illustrated in FIG. 13 et seq. involves a pair of sections the faces of which in their central areas are recessed or reduced in thickness. Each of these sections also includes portions which are thickened and disposed beyond the central areas and provided with open or V-shaped notches. It will primarily be understood that the messenger wire will be strung between poles or other suitable supports. The cables are similarly strung properly in a triangular arrangement. As will be appreciated, the cables are quite heavy having in mind the normal length of the span involved. In that span from eight to ten spreaders of the present type may be used. These spreaders are suspended from the messenger cable and due to the pivots present between the clamp and the supporting portions of the spreader per se, the latter will assume a vertical position.

Cables 10 are simply passed over the projecting parts at the ends of the spreader section as shown in FIG. 15 to rest within the notches 46 thereof. As a consequence of their own weight, these cables will tend to adequately seat themselves in the V-notch. Section 35 is now applied to the first section by passing the shank of the bolt through openings 48 and 51 with washers 71 and 72 in proper position and then loosely mounting nut 69 on the bolt. The weight of section 35 serves to assure a seating of the cables 10 within the notches if they have not already assumed such positions. The linesman will, of course, use force where necessary to assure such firm seating. With this accomplished he will tighten wing nut 69 of its equivalent. Downward movement of part 35 will not be resisted by washer 72 because the parts are initially only loosely connected and also in view of their glazed surfaces. After the bolt and nut assembly is tightened with the cables being firmly gripped part 35 will not work upwardly because of the wedge surfaces 49 and 50 which will lock the sections against movement. From the time section 35 is applied to the section 15 carried by the messenger cable, notch surfaces 41, 42 and 46 will cooperate to prevent any accidental displacement of cables 10 because of the extended parts defining the ends of portions 43, 44 and 45, which parts will overlap the adjacent edge zones of section 35. In both forms of construction, the notches being included in the thickened portions of the sections and those thickened portions overlapping each other, it follows that cables are actually gripped in the jaw assemblies, and not merely pinched between the different sections. In other words, the faces of the notches in different sections are opposed to each other throughout substantially their entire lengths. In the second form (FIGS. 13 to 19 inclusive) with a tightening of the bolt and nut assembly 67–60 the inclined surfaces cooperate in that notch jaws 46 move towards notches 41 so that intervening cables are clamped against movements. It is apparent that, should it be desired to remove or detach the spreader or support, this may readily be accomplished by simply loosening nut 69 to a sufficient extent and shifting the wedge-shaped section upwardly, which will allow passage of the cables out of contact with notches 46 and past the extensions adjacent thereto, as illustrated in FIG. 15.

Thus, among others, the several objects of the invention as specifically aforenoted are achieved. Obviously numerous changes in construction and rearrangements of the parts may be resorted to without departing from the spirit of the invention as defined by the claims.

I claim:

1. An aerial cable support including in combination a pair of sections each having upper and lower ends with side edges between those ends, outwardly and upwardly projecting parts extending from one section adjacent its upper end, the edge defining that upper end being formed with upwardly facing cable-receiving notches, outwardly projecting parts at the upper end of the other section and presenting downwardly extending cable-contacting edges overlying said notches to retain cables therein, the distance between the ends of the outwardly extending parts of said other section being less than the distance between the outwardly and upwardly projecting parts of said one section and such parts of said one section being disposed beyond and in overlapping relationship to said parts of the other section.

2. In a support as defined in claim 1, one of the sections presenting a side face having a recess extending in a direction between its upper and lower ends, and a pair of a side face of the other of said sections being slidably disposed within and guided by the surfaces defined by such recess.

3. An aerial cable support including in combination a pair of relatively flat sections each presenting inner faces, an edge zone of one section being formed with a cable-receiving notch, an edge zone of the other section extending adjacent said zone of that one section and bearing against a cable to retain it in such notch as the sections are slid in a direction axially with respect to each other, adjacent and similarly inclined surfaces on the inner faces of said sections and extending axially thereof and means engaging said sections to move them towards each other whereby said inclined surfaces cooperate to cause upward sliding movement of said other section relative to said one section.

4. In a support as defined in claim 3, said sections being formed with transverse openings in the areas of said inclined surfaces, one of said openings being elongated in the direction of the axis of said section; and means extending through said openings providing the said moving means.

5. In a support as defined in claim 4, an assembly including a bolt having its shank extending through said openings, a nut mounted by said bolt, said nut and the head of said bolt bearing against faces of said sections opposite their inner faces to provide said moving means and a resilient washer carried by said bolt and interposed between said inclined surfaces.

6. In a support as defined in claim 4, one of said sections having an outwardly bulged portion through which its opening is formed to provide in its inner face a longitudinally extending recess, inclined surfaces of such section being disposed one to each side of the center of said recess, a portion of the other section extending into said recess to guide said sections in their relative longitudinal movements and the inclined surface of said other section having a width such that it extends in line with the inclined surfaces of said one section.

7. In a support as defined in claim 3, a manipulating and suspending portion extending upwardly from said one section above the notch thereof and a pivotally connected clamp at the upper end of said suspending portion to rockingly couple the same with a messenger wire.

References Cited in the file of this patent
UNITED STATES PATENTS

| | | |
|---|---|---|
| 1,668,581 | Brown | May 8, 1928 |
| 2,899,160 | Sher et al. | Aug. 11, 1959 |
| 2,928,636 | Flower | Mar. 15, 1960 |

FOREIGN PATENTS

| | | |
|---|---|---|
| 39,775 | Austria | Nov. 25, 1909 |
| 162,444 | Austria | Feb. 25, 1949 |